US011618806B2

(12) United States Patent
Tsuji et al.

(10) Patent No.: US 11,618,806 B2
(45) Date of Patent: Apr. 4, 2023

(54) METHOD FOR PRODUCING COMPOSITION CONTAINING LOW MOLECULAR WEIGHT POLYTETRAFLUOROETHYLENE

(71) Applicant: DAIKIN INDUSTRIES, LTD., Osaka (JP)

(72) Inventors: Masayuki Tsuji, Osaka (JP); Takayuki Nakamura, Osaka (JP); Hirotoshi Yoshida, Osaka (JP); Yuuji Tanaka, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/968,033

(22) PCT Filed: Feb. 5, 2019

(86) PCT No.: PCT/JP2019/004048
§ 371 (c)(1),
(2) Date: Aug. 6, 2020

(87) PCT Pub. No.: WO2019/156065
PCT Pub. Date: Aug. 15, 2019

(65) Prior Publication Data
US 2021/0363311 A1 Nov. 25, 2021

(30) Foreign Application Priority Data
Feb. 7, 2018 (JP) .............................. JP2018-020426

(51) Int. Cl.
*C08J 3/28* (2006.01)
*C08F 14/26* (2006.01)

(52) U.S. Cl.
CPC ............... *C08J 3/28* (2013.01); *C08F 14/26* (2013.01)

(58) Field of Classification Search
CPC .... C08J 3/28; C08F 14/26; C08F 8/00; C08K 5/095
See application file for complete search history.

(56) References Cited

U.S. PATENT DOCUMENTS

| 4,777,192 A | 10/1988 | Neuberg et al. |
| 10,870,735 B2 * | 12/2020 | Yoshida ................. C08J 3/28 |
| 2018/0079927 A1 | 3/2018 | Yoshimoto et al. |
| 2020/0362192 A1 | 11/2020 | Yoshimoto et al. |

FOREIGN PATENT DOCUMENTS

| CN | 106750418 A | * | 5/2017 | |
| CN | 106750418 A | | 5/2017 | |
| JP | 47-19609 B1 | | 6/1972 | |
| JP | 1-294010 A | | 11/1989 | |
| JP | 10-147617 A | | 6/1998 | |
| JP | 2010-202741 A | | 9/2010 | |
| WO | 2016/159270 A1 | | 10/2016 | |
| WO | WO-2018026012 A1 | * | 2/2018 | ............... C08F 8/50 |

OTHER PUBLICATIONS

Lunkwitz et al., "Modification of perfluorinated polymers by high-energy irradiation", Journal of Fluorine Chemistry, vol. 125, No. 6, Jun. 1, 2004, pp. 863-873, XP004586011 (11 pages total).
Extended European Search Report dated Jul. 13, 2021 from the European Patent Office in counterpart EP Application No. 19751762.6.
International Search Report for PCT/JP2019/004048 dated Apr. 2, 2019.
International Preliminary Report on Patentability with the translation of Written Opinion dated Aug. 11, 2020 from the International Bureau in International Application No. PCT/JP2019/004048.
Extended European Search Report dated Jan. 17, 2023 from the European Patent Office in EP Application No. 22192357.6.

* cited by examiner

*Primary Examiner* — Sanza L. McClendon
(74) *Attorney, Agent, or Firm* — Sughrue Mion, PLLC

(57) ABSTRACT

A method for producing a composition containing low molecular weight polytetrafluoroethylene, the method including: (I) irradiating a composition containing high molecular weight polytetrafluoroethylene with ionizing radiation to obtain a composition containing low molecular weight polytetrafluoroethylene having a melt viscosity at 380° C. in the range of $1.0 \times 10^2$ to $7.0 \times 10^5$ Pa·s; and (II) carrying out at least one selected from the group consisting of washing treatment, steam treatment and decompression treatment on the composition containing low molecular weight polytetrafluoroethylene.

6 Claims, No Drawings

METHOD FOR PRODUCING COMPOSITION CONTAINING LOW MOLECULAR WEIGHT POLYTETRAFLUOROETHYLENE

CROSS REFERENCE TO RELATED APPLICATIONS

This application is a National Stage of International Application No. PCT/JP2019/004048 filed Feb. 5, 2019, claiming priority based on Japanese Patent Application No. 2018-020426, filed Feb. 7, 2018.

TECHNICAL FIELD

The present invention relates to a method for producing a composition containing low molecular weight polytetrafluoroethylene.

BACKGROUND ART

Since low molecular weight polytetrafluoroethylene (sometimes referred to as "low molecular weight PTFE" hereinafter) not only has excellent chemical stability and extremely low surface energy but also is unlikely to suffer fibrillation, it has been used for producing plastics, inks, cosmetics, coating materials, greases, etc. as an additive for enhancing lubricity or texture of a coating surface (e.g., Patent Literature 1). One of the methods for producing a composition containing such low molecular weight PTFE is a method of irradiating high molecular weight polytetrafluoroethylene (sometimes referred to as "PTFE" hereinafter) with ionizing radiation (e.g., Patent Literature 2).

CITATION LIST

Patent Literature

Patent Literature 1: Japanese Patent Laid-Open No. 10-147617
Patent Literature 2: Japanese Patent Publication No. 47-19609

SUMMARY OF INVENTION

Technical Problem

In such a composition containing low molecular weight PTFE as in Patent Literature 2, a low molecular weight fluorine-containing compound (sometimes referred to as "PFC" hereinafter), such as perfluorooctanoic acid (sometimes referred to as "PFOA" hereinafter) or its salt, can be contained. As a result of earnest studies by the present inventor, it has been found that PFC typified by such PFOA as above can be produced by irradiation with ionizing radiation.

It is an object of the present invention to obtain a composition containing low molecular weight PTFE, which has been reduced in a content of PFC.

Solution to Problem

According to a first aspect of the present invention, provided is a method for producing a composition containing low molecular weight PTFE, comprising:

(I) irradiating a composition containing PTFE with ionizing radiation to obtain a composition containing low molecular weight PTFE having a melt viscosity at 380° C. in the range of $1.0 \times 10^2$ to $7.0 \times 10^5$ Pa·s; and (II) carrying out at least one selected from the group consisting of washing treatment, steam treatment and decompression treatment on the composition containing low molecular weight PTFE.

Advantageous Effects of Invention

According to the present invention, a method suitable for producing a composition containing low molecular weight PTFE, which has been reduced in a content of PFC, can be obtained.

DESCRIPTION OF EMBODIMENTS

The method for producing a composition containing low molecular weight PTFE of the present invention comprises:

(I) irradiating a composition containing PTFE with ionizing radiation to obtain a composition containing low molecular weight PTFE having a melt viscosity at 380° C. in the range of $1.0 \times 10^2$ to $7.0 \times 10^5$ Pa·s (sometimes referred to as "step (I)" hereinafter); and (II) carrying out at least one selected from the group consisting of washing treatment, steam treatment and decompression treatment on the composition containing low molecular weight PTFE (sometimes referred to as "step (II)" hereinafter).

The step (I) will be described hereinafter.

The PTFE can be one obtained by a polymerization method that can be usually carried out, such as emulsion polymerization or suspension polymerization.

The PTFE may be one having, as a constituent unit derived from a monomer in a molecular structure, only a constituent unit derived from tetrafluoroethylene (TFE), or a constituent unit derived from a monomer having a structure other than TFE and a constituent unit derived from TFE (sometimes referred to as "modified PTFE" hereinafter).

The monomer having a structure other than TFE is not limited as long as it is copolymerizable with TFE, and a monomer usually used (e.g., perfluoroolefin such as hexafluoropropylene [HFP]; chlorofluoroolefin such as chlorotrifluoroethylene [CTFE]; hydrogen atom-containing fluoroolefin such as trifluoroethylene or vinylidene fluoride [VDF]; perfluorovinyl ether; perfluoroalkylethylene; ethylene) can be used. Only one of the monomers having a structure other than TFE may be used, or a plurality of them may be used.

Examples of the perfluorovinyl ether include, but not limited to, an unsaturated perfluoro compound represented by the following general formula (1):

$$CF_2=CF-ORf \qquad (1)$$

wherein Rf represents a perfluoro organic group. In the present specification, the "perfluoro organic group" means an organic group in which hydrogen atoms bonded to carbon atoms are all substituted by fluorine atoms. Examples of the perfluoro organic group include a perfluoroalkyl group and a perfluoro(alkoxyalkyl) group. The perfluoro organic group may have an oxygen atom that forms an ether linkage.

In one embodiment, the perfluorovinyl ether is, for example, a perfluoroalkyl vinyl ether (PAVE), wherein Rf is a perfluoroalkyl group having 1 to 10 carbon atoms (preferably 1 to 5 carbon atoms) in the above general formula (1).

Examples of the perfluoroalkyl group in the PAVE include a perfluoromethyl group, a perfluoroethyl group, a perfluoropropyl group, a perfluorobutyl group, a perfluoropentyl group and a perfluorohexyl group. A preferred perfluoroalkyl group is, for example, a perfluoropropyl group.

Preferred PAVE is perfluoropropyl vinyl ether (PPVE) in which the perfluoroalkyl group is a perfluoropropyl group.

In another embodiment, the perfluorovinyl ether is, for example, in the general formula (1), one in which Rf is a perfluoro(alkoxyalkyl) group having 4 to 9 carbon atoms;

one in which Rf is a group represented by the following formula:

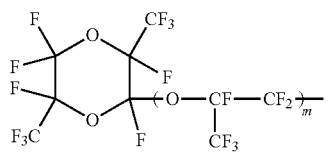

wherein m is 0 or an integer of 1 to 4; or one in which Rf is a group represented by the following formula:

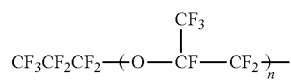

wherein n is an integer of 1 to 4.

Examples of the perfluoroalkylethylene include, but not limited to, (perfluorobutyl)ethylene (PFBE), (perfluorohexyl)ethylene and (perfluorooctyl)ethylene.

The monomer having a structure other than TFE is preferably at least one selected from the group consisting of HFP, CTFE, VDF, PPVE, PFBE and ethylene, and is more preferably at least one selected from the group consisting of HFP and CTFE.

In the modified PTFE, the constituent unit derived from the monomer having a structure other than TFE is preferably contained in an amount in the range of 0.001 to 1 mass %. In the modified PTFE, the constituent unit derived from the monomer having a structure other than TFE is more preferably contained in an amount of 0.01 mass % or more. In the modified PTFE, the constituent unit derived from the monomer having a structure other than TFE is more preferably contained in an amount of 0.5 mass % or less, and is still more preferably contained in an amount of 0.1 mass % or less. The content of the constituent unit derived from the monomer having a structure other than TFE can be determined by a known method such as Fourier transform infrared spectroscopy (FT-IR).

A standard specific gravity (SSG) of the PTFE is preferably in the range of 2.130 to 2.230. The SSG is a value measured in accordance with ASTM D 4894 when the PTFE is obtained by suspension polymerization, and is a value measured in accordance with ASTM D 4895 when the PTFE is obtained by emulsion polymerization. SSG or a melt viscosity can be usually used as an indication of a molecular weight of PTFE. PTFE having such SSG as above has an extremely high melt viscosity, and it is difficult to accurately measure the melt viscosity. Accordingly, in PTFE having such SSG as above, the SSG is usually used as an indication of the molecular weight.

A melting point of the PTFE is preferably in the range of 324° C. to 336° C. The melting point is a value measured by using, for example, a differential scanning calorimeter (DSC). Specifically, the melting point can be a minimum point of heat of fusion, which is obtained by using a DSC having been subjected to temperature calibration in advance using indium and lead as standard samples and increasing the temperature at 10° C./min in the temperature region of 250° C. to 380° C. in an air stream at 200 ml/min.

The composition containing PTFE is preferably substantially composed of PTFE. The expression "substantially composed of PTFE" means that PTFE can be contained in an amount of 90 mass parts or more, specifically in an amount of 95 mass parts or more, based on 100 mass parts of the composition. The upper limit of the content of PTFE based on 100 mass parts of the composition is not limited, but it can be, for example, 100 mass parts or less, specifically 98 mass parts or less.

The composition containing PTFE may be one containing PFOA or its salt, or may be one substantially free from PFOA or its salt. Here, the expression "substantially free from" means that the amount of PFOA, in terms of mass, based on PTFE is less than 25 ppb, preferably 15 ppb or less, more preferably 5 ppb or less, particularly preferably less than the detection limit. The expression "less than the detection limit" means, for example, less than 5 ppb. In the present specification, the above content indicates a total amount of PFOA and its salt, unless otherwise noted.

The composition containing PTFE is preferably substantially free from PFOA or its salt. Here, the expression "substantially free from" has the same meaning as above. Even when the composition containing PTFE and substantially free from PFOA or its salt is used as in the present embodiment, PFOA or its salt can be formed by irradiating the PTFE with ionizing radiation in the step (I).

Examples of the salt of PFOA include an ammonium salt, a sodium salt and a potassium salt of PFOA.

The content of the PFOA and its salt can be measured by using liquid chromatography. More specifically, the PFOA and its salt are extracted from the composition containing PTFE using a solvent, and the amount of the PFOA and its salt contained in the solvent after extraction can be measured by using liquid chromatography.

As the composition containing PTFE, one containing PFC may be used, or one substantially free from PFC may be used. Here, the expression "substantially free from" means that the amount of PFC, in terms of mass, based on PTFE is less than 25 ppb, preferably 15 ppb or less, more preferably 5 ppb or less, particularly preferably less than the detection limit. The expression "less than the detection limit" means, for example, less than 5 ppb.

The composition containing PTFE is preferably substantially free from PFC. Even when the composition containing PTFE and substantially free from PFC is used as in the present embodiment, PFC can be formed by irradiating the PTFE with ionizing radiation in the step (I). Here, the expression "substantially free from" has the same meaning as above. In the present specification, when PFCs of a plurality of structures is present, the above content indicates a total amount of PFCs of a plurality of structures, unless otherwise noted.

The content of the PFC can be measured by using, for example, liquid chromatography. More specifically, from the composition containing PTFE, the PFC is extracted using a solvent, and the amount of the PFC contained in the solvent after extraction can be measured by using liquid chromatography.

In the present specification, PFC means a low molecular weight fluorine-containing compound such as PFOA or its salt, specifically means a low molecular weight fluorine-containing compound having a functional group or its derivative, and more specifically means an acid having a fluorine-containing carbon chain or its derivative. The fluorine-containing carbon chain indicates a carbon chain in which one or more of hydrogen atoms bonded to carbon atoms are substituted by fluorine atoms. Examples of the acid include carboxylic acid and sulfonic acid. Examples of the derivative include salts. Examples of the salt include an ammonium salt, a sodium salt and a potassium salt.

Examples of the PFC include an acid having a fluorine-containing carbon chain having 6 to 14 carbon atoms and its derivative.

Examples of the shape of the composition containing PTFE include, but not limited to, a powder, a molded body, a scrap, a fragment that can be produced during formation of a molded body, a cutting chip produced during cutting of a molded body, and a preform.

In one embodiment, the shape of the composition containing PTFE is powder. The present embodiment is advantageous from the viewpoint that the resin component containing PTFE can be uniformly irradiated with ionizing radiation. According to the present embodiment, a powdery composition containing low molecular weight PTFE can be easily obtained.

In one embodiment, the composition containing PTFE is a molded body. In the present embodiment, the composition containing PTFE can be one having been subjected to a molding step of heating the composition containing PTFE to a primary melting point or higher. That is to say, the production method of the present invention can further include, prior to the step (I), a step of heating the composition containing PTFE to a primary melting point of PTFE or higher to form a molded body of the composition containing PTFE.

The primary melting point can be measured by using DSC. Specifically, the primary melting point is a maximum peak temperature of an endothermic curve appearing on a crystal melting curve, and the endothermic curve is obtained by heating uncalcined PTFE under the conditions of a temperature-increasing rate of 10° C./min. The primary melting point can be usually a temperature of 320° C. or higher. The uncalcined PTFE indicates PTFE free from heat history of being heated to a temperature of the primary melting point or higher.

The shape of the molded body is not limited. Examples of the shape of the molded body include tape-like, sheet-like, rod-like, tubular, and fibrous shapes.

A specific gravity of the molded body is preferably 1.0 $g/cm^3$ or more, more preferably 1.5 $g/cm^3$ or more, and is preferably 2.5 $g/cm^3$ or less. The specific gravity can be measured by an underwater replacement method.

In one embodiment, the composition containing PTFE is a scrap, a fragment that can be produced during formation of a molded body, or a cutting chip produced during cutting of a molded body.

In one embodiment, the composition containing PTFE is a preform. Here, the preform refers to a molded body that is obtained by compressing powdery PTFE and has not been subjected to a calcining step (has not been heated to a temperature of the primary melting point or higher).

Irradiation with ionizing radiation can be carried out by a conventionally known method and under the conventionally known conditions. By the irradiation with ionizing radiation, the PTFE contained in the composition containing PTFE is decreased in molecular weight and becomes low molecular weight PTFE. By the irradiation with ionizing radiation, PFC such as PFOA or its salt can be produced.

Examples of the ionizing radiation include electron ray, γ-ray, X-ray, neutron beam and high energy ion. The ionizing radiation is preferably electron ray or γ-ray.

The irradiation with ionizing radiation is not limited, but can be carried out in, for example, air, a hydrocarbon-based gas, water, or a solvent.

In one embodiment, the irradiation with ionizing radiation can be carried out in air. The present embodiment is preferable from the viewpoint of reduction of cost.

An irradiation dose of the ionizing radiation is preferably in the range of 1 to 2,500 kGy. The irradiation dose of the ionizing radiation is more preferably 1,000 kGy or less, still more preferably 750 kGy or less. The irradiation dose of the ionizing radiation is more preferably 10 kGy or more, particularly preferably 50 kGy or more.

An irradiation temperature of the ionizing radiation is, for example, 0° C. or higher. The upper limit of the irradiation temperature of the ionizing radiation is not limited as long as it is a melting point of PTFE or lower. From the viewpoint of suppression of crosslinking of PTFE molecular chain, the irradiation temperature of the ionizing radiation is preferably 320° C. or lower, more preferably 300° C. or lower, still more preferably 260° C. or lower. From the viewpoint of reduction of production cost, irradiation with ionizing radiation can be carried out at 15° C. (e.g., 19° C.) to 60° C.

The resin component contained in the composition obtained in the step (I) is preferably substantially composed of low molecular weight PTFE. The expression "substantially composed of low molecular weight PTFE" means that the low molecular weight PTFE can be contained in an amount of, for example, 90 mass parts or more, specifically 95 mass parts or more, based on 100 mass parts of the composition. The upper limit of the low molecular weight PTFE based on 100 mass parts of the composition is not limited, but it can be, for example, 100 mass parts or less, specifically 98 mass parts or less.

The shape of the composition obtained in the step (I) is not limited.

In one embodiment, the shape of the composition obtained in the step (I) is powder. This composition is advantageous from the viewpoint of ease of treatment in or after the step (II).

In the above embodiment, an average particle size of the low molecular weight PTFE in the composition obtained in the step (I) is preferably 1,000 μm or less, more preferably 300 μm or less, still more preferably 100 μm or less. The lower limit of the average particle size of the low molecular weight PTFE is not limited, but it is, for example, more than 1 μm. Since the low molecular weight PTFE has such an average particle size, the diameters of particles contained in the composition can become relatively small.

The average particle size of the low molecular weight PTFE can be measured by using a laser diffraction particle size distribution measurement apparatus. Specifically, the average particle size is taken to be equal to a particle size corresponding to 50% (based on volume) of particle size distribution integration obtained by carrying out measurement at a dispersion pressure of 1.0 bar without using a cascade. The laser diffraction particle size distribution measurement apparatus may be, for example, laser diffraction particle size distribution measurement apparatus manufactured by JEOL Ltd. (trade name: HELOS & RODOS).

A melt viscosity of the low molecular weight PTFE at 380° C. is in the range of $1.0 \times 10^2$ to $7.0 \times 10^5$ Pa·s. A more preferred lower limit of the melt viscosity is $1.5 \times 10^3$ Pa·s or more. A more preferred upper limit of the melt viscosity is $3.0 \times 10^5$ Pa·s or less. In the present invention, the "low molecular weight PTFE" means PTFE having a melt viscosity in the above range. In the case of low molecular weight PTFE having such a melt viscosity as above, it is difficult to form a molded body for use in the measurement of the aforesaid standard specific gravity (SSG), and it is difficult to measure accurate SSG of the low molecular weight PTFE. Accordingly, a melt viscosity is usually used as an indication of a molecular weight of low molecular weight PTFE.

In accordance with ASTM D 1238, the melt viscosity can be measured using 2 g of a sample having been heated in advance at the measuring temperature (380° C.) for 5 minutes and using a flow tester (manufactured by Shimadzu Corporation) and a die of 2φ-8L while maintaining the sample at the above temperature under a load of 0.7 MPa.

The low molecular weight PTFE can be non-fibrillatable.

A melting point of the low molecular weight PTFE is preferably in the range of 324° C. to 336° C. This melting point can be measured using a method described above as the method for measuring a melting point of PTFE.

The step (II) will be described hereinafter.

The step (II) is a step in which at least one selected from the group consisting of washing treatment, steam treatment and decompression treatment is carried out on the composition containing low molecular weight PTFE obtained in the step (I). By carrying out the step (II), a composition containing low molecular weight PTFE and having a low content of PFC can be obtained.

In other words, the step (II) is a step in which PFC is removed from the composition containing low molecular weight PTFE obtained in the step (I) to form a composition containing low molecular weight PTFE and having a low content of PFC.

Although the content of PFC contained in the composition containing low molecular weight PTFE obtained in the step (I) is not limited, it is, for example, 25 mass ppb or more based on the low molecular weight PTFE.

A content of the PFOA or its salt contained in the composition containing low molecular weight PTFE obtained in the step (I) is not limited, but it is, for example, 25 mass ppb or more based on the low molecular weight PTFE.

The at least one treatment selected from the group consisting of washing treatment, steam treatment and decompression treatment may be carried out only once, or may be carried out a plurality of times. When these are carried out a plurality of times, the same method may be repeatedly carried out, or different methods may be carried out in combination.

The washing treatment can be carried out using a solution containing at least one selected from the group consisting of water and an organic solvent (sometimes referred to as a "washing solution" hereinafter).

It is preferable to use a polar solvent as the organic solvent. Examples of the polar solvent include alcohols, such as methanol, ethanol, and isopropyl alcohol (IPA); ketones, such as acetone, methyl ethyl ketone, methyl isobutyl ketone (MIBK), and diisobutyl ketone (DIBK); nitriles, such as acetonitrile; N,N-dimethylformamide, and dimethyl sulfoxide.

It is preferable to use an alkaline solution as the washing solution, and it is more preferable to use a solution of ammonia, sodium hydroxide or the like. From the viewpoint of obtaining low molecular weight PTFE having a low content of a metallic atom, a solution of ammonia is preferably used.

The washing treatment may be carried out only once, or may be carried out a plurality of times. When the washing treatment is carried out a plurality of times, the washing solutions may be the same as one another, or may be different from one another. The washing solutions may be those of the same concentration, or may be those of different concentrations.

The washing treatment can be carried out by applying at least one selected from the group consisting of stirring, heating and ultrasonic waves to the composition immersed in the washing solution.

A method for applying stirring is not limited, and a method that can be usually used, such as a method of using a stirrer or a stirring blade, can be used.

A method for applying ultrasonic waves is not limited, and a method that can be usually used can be used.

The washing treatment can be carried out under pressure, at normal pressure or under reduced pressure. From the viewpoint of suppression of production cost, the washing treatment is preferably carried out at normal pressure.

In a preferred embodiment, the washing treatment is carried out by using water, an alkaline aqueous solution or a polar solvent as the washing solution and applying at least one selected from the group consisting of stirring, heating and ultrasonic waves to the composition immersed in the washing solution.

In a preferred embodiment, water washing treatment is further carried out after the washing treatment. The water washing treatment is preferably carried out until pH of wash water becomes 6.5 to 8.0.

In a more preferred embodiment, drying treatment is carried out after the washing treatment.

A method for carrying out the drying treatment is not limited, but the drying treatment can be carried out using, for example, a box type dryer, a hot air circulation type dryer, a vacuum dryer, a spray dryer, a vibration dryer, a fluidized bed dryer, or a fixed bed dryer. The drying treatment can be specifically carried out using a box type dryer, a hot air circulation type dryer or the like.

The drying treatment can be carried out in the temperature range of, for example, 100° C. to 260° C. From the viewpoints of productivity and safety, the drying treatment is preferably carried out in the temperature range of 100° C. to 140° C.

The drying treatment can be carried out in order to remove water, a solvent or the like used for the washing. The time for carrying out the drying treatment can be set to, for example, 5 to 24 hours.

By carrying out the drying treatment, the content of PFC contained in the composition containing low molecular weight PTFE obtained by the production method of the present invention can be further reduced.

By carrying out the drying treatment, the content of PFOA or its salt contained in the composition containing low molecular weight PTFE obtained by the production method of the present invention can be further reduced.

The steam treatment can be carried out by bringing a treatment solution in the form of steam and the composition containing low molecular weight PTFE provided to the step (II) into contact with each other.

The treatment solution may be water, an alkaline aqueous solution, or a polar solvent.

The steam treatment is preferably carried out using steam of 90° C. to 160° C., and is more preferably carried out using steam of 95° C. to 120° C.

The steam treatment can be carried out using water, an alkaline solution or a polar solvent as the treatment solution in the form of steam at a temperature in the range of 90° C. to 160° C.

The steam treatment is preferably carried out using an alkaline solution having been heated to 90° C. to 160° C., and is more preferably carried out using an alkaline solution having been heated to 95° C. to 120° C.

The steam treatment is preferably carried out under pressure. The steam treatment is more preferably carried out at a pressure in the range of 0.1 to 0.2 MPa, and is still more preferably carried out at a pressure in the range of 0.1 to 0.15 MPa.

In a preferred embodiment, the steam treatment can be carried out at a temperature in the range of 90° C. to 160° C. though the temperature varies depending on the treatment solution.

The steam treatment can be carried out by bringing the treatment solution in the form of steam and the composition containing low molecular weight PTFE provided to the step (II) into contact with each other for, for example, 10 minutes to 1 hour.

In a more preferred embodiment, drying treatment is carried out after the steam treatment. The drying treatment can be carried out in the same manner as described above.

By carrying out the drying treatment, the content of PFC contained in the composition containing low molecular weight PTFE obtained by the production method of the present invention can be further reduced.

By carrying out the drying treatment, the content of PFOA or its salt contained in the composition containing low molecular weight PTFE obtained by the production method of the present invention can be further reduced.

The decompression treatment can be carried out at a gauge pressure of −0.01 to −0.1 MPa, specifically −0.05 to −0.1 MPa.

The time for carrying out the decompression treatment is not limited, but it is in the range of, for example, several minutes to 10 days.

A method for carrying out the decompression treatment is not limited, but the decomposition treatment can be carried out by using, for example, a vacuum dryer, an accumulator, or a double cone vacuum stirring machine.

The step (II) can further include grinding treatment. Specifically, the step (II) can be a step in which at least one selected from the group consisting of washing treatment, steam treatment and decompression treatment is carried out on the composition containing low molecular weight PTFE obtained in the step (I), and grinding treatment is carried out. The washing treatment, the steam treatment and the decompression treatment are as described above.

In one embodiment, the step (II) can be a step in which at least one selected from the group consisting of washing treatment, steam treatment and decompression treatment is carried out on the composition containing low molecular weight PTFE obtained in the step (I), and thereafter, grinding treatment is carried out.

In one embodiment, the step (II) can be a step in which grinding treatment is carried out on the composition containing low molecular weight PTFE obtained in the step (I), and thereafter, at least one selected from the group consisting of washing treatment, steam treatment and decompression treatment is carried out. In the above step, a plurality of treatment may be carried out in combination.

In a preferred embodiment, in the step (II), grinding treatment is carried out on the composition containing low molecular weight PTFE obtained in the step (I), and thereafter, at least one selected from the group consisting of washing treatment, steam treatment and decompression treatment is carried out on the grinding-treated low molecular weight PTFE composition. According to the present embodiment, removal of PFC typified by PFOA or its salt can be more effective.

A method for the grinding treatment is not limited, but it is, for example, a method of grinding using a grinder. Examples of the grinder include impact type grinders, such as a hammer mill, a pin mill and a jet mill, and mill type grinders, such as a cutter mill that performs grinding by means of shear force produced by a rotary blade and an outer peripheral stator (stationary blade).

The temperature for carrying out the grinding treatment is preferably −200° C. or higher and lower than 50° C.

In one embodiment, the grinding is freeze grinding and can be usually carried out at a temperature in the range of −200° C. to −100° c. In the present embodiment, the temperature can be generally adjusted using liquid nitrogen.

In one embodiment, the grinding is carried out at a temperature in the vicinity of room temperature (e.g., in the range of 10° C. to 50° C.).

In one embodiment, the grinding can be carried out at 10° C. or higher and lower than 50° C., is preferably carried out at a temperature in the range of 10° C. to 40° C., and is more preferably carried out at a temperature in the range of 10° C. to 30° C. The present embodiment is preferable from the viewpoints of simplification of the step and reduction of cost required for the grinding.

The method for producing a composition containing low molecular weight PTFE of the present invention may further include classification treatment.

In the classification treatment, for example, airflow classification can be used. Specifically, the classification treatment may be one in which fine particles or fibrous particles are removed by airflow classification and then coarse particles are further removed by classification.

In the airflow classification, low molecular weight PTFE particles (e.g., ground particles) are fed to a column-like classification room by decompressed air and dispersed by swirl airflow in the room, and the fine particles are classified by centrifugal force. The fine particles are recovered with a cyclone and a bug filter from the center. In the classification room, a cone in a conical shape or a rotating body such as a rotor is installed in order to allow the ground particles and air to uniformly perform swirling motion.

When classification cones are used, adjustment of classification points is carried out by adjusting a flow rate of secondary air and a gap between the classification cones. When a rotor is used, a flow rate in the classification room is adjusted by the number of revolutions of the rotor.

Examples of the method for removing coarse particles include airflow classification using a mesh, a vibrating screen and an ultrasonic sieve, and airflow classification is preferable.

In one embodiment, the classification treatment may be carried out prior to the step (I).

In one embodiment, the classification treatment is carried out on the composition having been subjected to the grinding treatment.

In a preferred embodiment, the step (II) is a step in which grinding treatment is carried out on the composition containing low molecular weight PTFE obtained in the step (I), then classification treatment is carried out, and thereafter, at least one selected from the group consisting of washing treatment, steam treatment and decompression treatment is carried out to obtain a composition containing low molecular weight PTFE.

In another preferred embodiment, the step (II) is a step in which grinding treatment is carried out on the composition containing low molecular weight PTFE obtained in the step (I), then at least one selected from the group consisting of washing treatment, steam treatment and decompression treatment is carried out, and thereafter, classification treatment is carried out to obtain a composition containing low molecular weight PTFE.

A content of PFOA and its salt contained in the composition containing low molecular weight PTFE obtained in the present invention is preferably less than 25 ppb, more preferably 15 ppb or less, still more preferably less than 5 ppb, in terms of mass, based on the low molecular weight PTFE. The lower limit of the content of PFOA and its salt is not limited, but it is, for example, less than the detection limit, more specifically 0 ppb.

According to the present invention, a composition containing low molecular weight PTFE and having a low content of PFOA and its salt as described above can be obtained. The above content indicates a total amount of PFOA and its salt. The salt of PFOA is as previously described.

The content of the PFOA and its salt can be measured by using liquid chromatography. More specifically, from the composition that is a measuring object, the PFOA and its salt are extracted using a solvent, and the amount of the PFOA and its salt contained in the solvent after extraction can be measured by using liquid chromatography.

A content of PFC contained in the composition containing low molecular weight PTFE obtained by the production method of the present invention is preferably 50 ppb or less, more preferably less than 25 ppb, still more preferably 15 ppb or less, particularly preferably 5 ppb or less, very particularly preferably less than 5 ppb, in terms of mass, based on the low molecular weight PTFE. The lower limit of the content of the PFC is not limited, but it is, for example, less than the detection limit, more specifically 0 ppb. According to the present invention, a composition containing low molecular weight PTFE and having a low content of PFC as described above can be obtained. When PFCs of a plurality of structures are present, the above content indicates a total amount of PFCs of a plurality of structures. The PFC is as previously described.

The content of the PFC can be measured by using, for example, liquid chromatography. More specifically, from the composition that is a measuring object, the PFC is extracted using a solvent, and the amount of the PFC contained in the solvent after extraction can be measured by using liquid chromatography.

In one embodiment, the shape of the composition containing low molecular weight PTFE obtained by the production method of the present invention is powder. A specific surface area of the powder of the present embodiment is preferably in the range of 0.1 to 30.0 m$^2$/g. The specific surface area can be obtained by using a surface analyzer. Specifically, the specific surface area is measured by BET method using a mixed gas consisting of 30% of nitrogen and 70% of helium as a carrier gas and using liquid nitrogen as a refrigerant. The surface analyzer may be, for example, BELSORP-mini II (trade name, manufactured by MicrotracBEL Corp.). The specific surface area is more preferably 7.0 m$^2$/g or more.

In one embodiment, the shape of the composition containing low molecular weight PTFE obtained by the production method of the present invention is powder. A specific surface area of the powder of the present embodiment is 0.1 m$^2$/g or more and less than 7.0 m$^2$/g. A method for measuring the specific surface area is as described above. Such low molecular weight PTFE can be easily dispersed in a matrix material. The matrix material may be a plastic, an ink, a coating material, or the like.

The lower limit of the specific surface area of the powder (specifically, low molecular weight PTFE) of the present embodiment is preferably 1.0 m$^2$/g or more. The upper limit of the specific surface area of the powder of the present embodiment is preferably 5.0 m$^2$/g or less, more preferably 3.0 m$^2$/g or less.

In one embodiment, the shape of the composition containing low molecular weight PTFE obtained by the production method of the present invention is powder. A specific surface area of the powder of the present embodiment is 7.0 m$^2$/g or more and 30.0 m$^2$/g or less. A method for measuring the specific surface area is as described above. In the case of such low molecular weight PTFE, the sizes of particles dispersed in a matrix material are small, so that an effect of surface modification, such as an effect of enhancing texture of a coating surface, is high, and the oil absorption can be high. The matrix material may be an oil, a grease, a coating material, a plastic, or the like.

The lower limit of the specific surface area of the powder (specifically, low molecular weight PTFE) of the above embodiment is preferably 8.0 m$^2$/g or more. The upper limit of the specific surface area of the powder (specifically, low molecular weight PTFE contained in the composition) of the present embodiment is preferably 30.0 m$^2$/g or less, and is more preferably 20.0 m$^2$/g or less.

In one embodiment, the shape of the composition containing low molecular weight PTFE obtained by the production method of the present invention is powder. An average particle size of the powder of the present embodiment is preferably in the range of 0.5 to 200 μm. The average particle size is more preferably 100 μm or less, still more preferably 50 μm or less. The average particle size is, for example, 1.0 μm or more. The low molecular weight PTFE obtained by the present invention has such an average particle size as above, and therefore, when it is added to a coating material as, for example, an additive, it can contribute to formation of a coating film having more excellent surface smoothness.

A method for measuring the average particle size of the composition containing low molecular weight PTFE obtained by the production method of the present invention is as described as the method for measuring the average particle size of the low molecular weight PTFE obtained in the step (I).

In a preferred embodiment, the composition containing low molecular weight PTFE obtained by the production method of the present invention is in powder form.

The composition containing low molecular weight PTFE obtained by the present invention can be used after it is molded, when needed.

In one embodiment, the method of the present invention is a method for purifying a composition containing low molecular weight PTFE, comprising:

irradiating a composition containing PTFE with ionizing radiation to obtain a composition containing low molecular weight PTFE having a melt viscosity at 380° C. in the range of $1.0 \times 10^2$ to $7.0 \times 10^5$ Pa·s; and carrying out at least one selected from the group consisting of washing treatment, steam treatment and decompression treatment on the composition containing low molecular weight PTFE obtained above.

The composition containing low molecular weight PTFE obtained by the present invention is preferably a powder, and can be preferably used as an additive for modifying a molding material, an ink, a cosmetic, a coating material, a grease, a member for office automation equipment, a toner or the like, an additive for a plating solution, or the like. Examples of the molding material include engineering plastics, such as polyoxybenzoyl polyester, polyimide, polyamide, polyamideimide, polyacetal, polycarbonate and polyphenylene sulfide. The composition containing low molecular weight PTFE can be preferably used particularly as a thickening agent for grease.

The composition containing low molecular weight PTFE obtained by the present invention is preferably a powder, and can be used as an additive for a molding material. The composition can be preferably used, for example, for the purpose of enhancing non-stickiness and sliding property of a copy roll or a photoreceptor; for the purpose of enhancing texture of engineering plastic molded products, such as a surface layer sheet of furniture, a dashboard of an automobile, and a cover of an appliance; for the purpose of enhancing lubricity or abrasion resistance of machine parts that can cause mechanical friction, such as a light-load bearing, a gear, a cum, buttons of push-button telephone, a projector, camera parts, and a sliding material; or as a processing aid for engineering plastics, or the like.

The composition containing low molecular weight PTFE obtained by the present invention is preferably a powder, and can be used for the purpose of enhancing lubricity of a varnish or a paint, as an additive for a coating material. The composition containing low molecular weight PTFE can be used for the purpose of enhancing lubricity of cosmetics such as foundation, as an additive for cosmetics.

The composition containing low molecular weight PTFE obtained by the present invention is preferably a powder, and can be preferably used for the purpose of enhancing oil-repellency or water-repellency of a wax or the like and for the purpose of enhancing lubricity of a thickening agent for grease, a grease or a toner.

The composition containing low molecular weight PTFE obtained by the present invention is preferably a powder, and can be used also as an electrode binder for a secondary battery or a fuel battery, a hardness adjuster for an electrode binder, a water-repellent for an electrode surface, or the like.

The composition containing low molecular weight PTFE obtained by the present invention is preferably a powder, and can be used together with a lubricating oil to prepare a grease. Since the grease is characterized by containing the powdery composition containing low molecular weight PTFE and a lubricating oil, the composition containing low molecular weight PTFE can be uniformly and stably dispersed in the lubricating oil. The grease can be excellent in properties such as heat resistance, load-bearing property, electrical insulation property and low hygroscopicity.

The lubricating oil (base oil) may be a mineral oil, or may be a synthetic oil. Examples of the lubricating oil (base oil) include paraffinic or naphthenic mineral oils, and synthetic oils, such as synthetic hydrocarbon oil, ester oil, fluorine oil and silicone oil. From the viewpoint of heat resistance, fluorine oil is preferable, and examples of the fluorine oil include perfluoropolyether oil and a low polymer of ethylene chloride trifluoride. The low polymer of ethylene chloride trifluoride may have a weight-average molecular weight of 500 to 1,200.

In the grease, other thickening agents may be further used in combination. Examples of the thickening agent include metallic soap, composite metallic soap, bentonite, phthalocyanine, silica gel, a urea compound, a urea-urethane compound, a urethane compound, and an imide compound. Examples of the metallic soap include sodium soap, calcium soap, aluminum soap and lithium soap. Examples of the urea compound, the urea-urethane compound and the urethane compound include a diurea compound, a triurea compound, a tetraurea compound, other polyurea compounds, urea-urethane compounds and diurethane compounds, and mixtures thereof.

The grease preferably contains the powdery composition containing low molecular weight PTFE in an amount of 0.1 to 50 mass %, more preferably contains the composition in an amount of 0.5 mass % or more, and more preferably contains the composition in an amount of 30 mass % or less. Since the powdery composition containing low molecular weight PTFE is contained in the above amount, a grease having an appropriate hardness can be obtained. The grease can exhibit sufficient lubricity and can exhibit appropriate sealing property.

The grease can further contain a solid lubricant, an extreme pressure agent, an antioxidant, an oiliness agent, a rust preventive, a viscosity index improver, a detergent dispersant, etc.

EXAMPLES

The present invention will be more specifically described with reference to the following Examples, but the present disclosure is in no way limited to those Examples.

Comparative Example 1

In a barrier nylon bag, 50 g of POLYFLON® PTFE F-104 (manufactured by DAIKIN INDUSTRIES, LTD., concentration of PFC and concentration of PFOA were each the detection limit or less) was weighed, and the bag was sealed by means of heat sealing. Subsequently, the PTFE F-104 in the bag was irradiated with cobalt-60 γ-ray at 150 kGy at room temperature, thereby obtaining a low molecular weight PTFE powder. The resulting low molecular weight PTFE powder was used as a sample for measuring contents of PFOA and a perfluorocarboxylic acid having 6 to 14 carbon atoms and its derivative. Further, a melt viscosity of the resulting low molecular weight PTFE powder was measured. The results are set forth in Table 2.

Examples 1

The low molecular weight PTFE powder obtained in Comparative Example 1 was spread on a 200-mesh stainless steel sieve. Subsequently, using a stainless steel pipe of ⅜ inch, steam of 100° C. was allowed to pass from under the sieve for 30 minutes in such a manner that the steam uniformly came into contact with the low molecular weight PTFE. The steam-treated low molecular weight PTFE was used as a sample for measurement of contents of PFOA, and a perfluorocarboxylic acid having 6 to 14 carbon atoms and its derivative.

By drying the low molecular weight PTFE at 110° C. for 12 hours, drying-treated low molecular weight PTFE was obtained. A melt viscosity of the low molecular weight PTFE powder obtained after the drying was measured. The results are shown in Table 2.

Examples 2 to 5

The low molecular weight PTFE powder obtained in Comparative Example 1 was placed in a 6 L stainless steel container (with three-one motor, equipped with propeller stirring blade) and washed using a washing solution. The washing-treated low molecular weight PTFE was used as a sample for measurement of contents of PFOA, and a perfluorocarboxylic acid having 6 to 14 carbon atoms and its derivative. The type and the temperature of the washing solution and the time in which washing was carried out are as in Table 2.

By drying the low molecular weight PTFE at 110° C. for 12 hours, drying-treated low molecular weight PTFE was obtained. A melt viscosity of the low molecular weight PTFE powder obtained after the drying was measured. The results are shown in Table 2.

Example 6

By allowing the low molecular weight PTFE powder obtained in Comparative Example 1 to stand still at −0.09 MPa (gauge pressure) for 48 hours, treated low molecular weight PTFE was obtained. The resulting low molecular weight PTFE powder was used as a sample for measurement of contents of PFOA, and a perfluorocarboxylic acid having 6 to 14 carbon atoms and its derivative. Further, a melt viscosity of the resulting low molecular weight PTFE powder was measured. The results are shown in Table 2.

(Measurement of Melt Viscosity)

Melt viscosities of the low molecular weight PTFE obtained in Comparative Example 1 and Example 6 and the drying-treated low molecular weight PTFE obtained in Examples 1 to 5 were each measured.

In accordance with ASTM D 1238, the melt viscosity was measured using 2 g of a sample having been heated in advance at the measuring temperature (380° C.) for 5 minutes and using a flow tester (manufactured by Shimadzu Corporation) and a die of 2ϕ-8L while maintaining the sample at the above temperature under a load of 0.7 MPa.

(Measurement of Content of PFOA and its Salt)

Using a liquid chromatograph mass spectrometer (Waters, LC-MS ACQUITY UPLC/TQD), a content of PFOA contained in the sample for measurement was measured.

Specifically, regarding the samples for measurement of Comparative Example 1 and Example 6, 1 g of each sample was weighed (powder for measurement), then 5 ml of acetonitrile was added, and the mixture was subjected to ultrasonic treatment for 60 minutes to extract PFOA. Regarding the samples for measurement of Examples 1 to 5, 10 g of each sample was weighed, and the sample was filtered using a 330-mesh JIS test sieve and subsequently subjected to tapping for 30 minutes to perform dehydration. To 1 g of the dehydrated powder (powder for measurement), 5 ml of acetonitrile was added, and the mixture was subjected to ultrasonic treatment for 60 minutes to extract PFOA. A water content and a content of the low molecular weight PTFE in each of the powders for measurement of Examples 1 to 5 were determined by drying the powder for measurement in a dryer having been set to 120° C. and carrying out calculation using the weights before and after the drying.

A content of PFOA in the resulting liquid phase was measured using MRM (Multiple Reaction Monitoring) method. Acetonitrile (A) and an ammonium acetate aqueous solution (20 mmol/L) (B) were used as mobile phases, and they were fed at a concentration gradient (A/B=40/60-2 min-80/20-1 min). ACQUITY UPLC BEH C18 1.7 μm was used as a separatory column, the column temperature was set at 40° C., and the injection quantity was set to 5 μL. In the ionization method, ESI (Electrospray ionization) Negative was used, a cone voltage was set at 25 V, and measurement of precursor ion molecular weight/product ion molecular weight resulted in 413/369. The content of PFOA was calculated using an external standard method. The detection limit in this measurement was 5 ppb.

(Measurement of Content of Perfluorocarboxylic Acid Having 6 to 14 Carbon Atoms and its Derivative)

Using a liquid chromatograph mass spectrometer (Waters, LC-MS ACQUITY UPLC/TQD), a content of a perfluorocarboxylic acid having 6 to 14 carbon atoms contained in the sample for measurement obtained in each of Examples and Comparative Example was measured.

Specifically, the above content was measured by the use of the MRM method using, as a solution, a liquid phase extracted in the measurement of PFOA. Under the measurement conditions changed in concentration gradient (A/B=10/90-1.5 min-90/10-3.5 min) from the measurement conditions for PFOA, the precursor ion molecular weight/product ion molecular weight described in Table 1 were measured. The total amount of perfluorocarboxylic acids having 6 to 14 carbon atoms was calculated from the following formula using the content (X) of perfluorooctanoic acid obtained in the above measurement. The detection limit in this measurement was 5 ppb.

$$(A_{c6}+A_{c7}+A_{c8}+A_{c9}+A_{c10}+A_{c11}+A_{c12}+A_{c13}+A_{c14})/A_{c8} \times X$$

wherein $A_{c6}$ to $A_{c14}$ represent peak areas of carboxylic acids having 6 carbon atoms to 14 carbon atoms, respectively; and X represents a content of perfluorooctanoic acid (8 carbon atoms) calculated from the result of the measurement by the MFM method, using an external standard method.

TABLE 1

| Number of carbon atoms of carboxylic acid | Precursor ion molecular weight | Product ion molecular weight |
| --- | --- | --- |
| 6 | 313 | 269 |
| 7 | 363 | 319 |
| 8 | 413 | 369 |
| 9 | 463 | 419 |
| 10 | 513 | 469 |
| 11 | 563 | 519 |
| 12 | 613 | 569 |
| 13 | 663 | 619 |
| 14 | 713 | 669 |

The results are shown in the following table. In the following table, the "content of C6 to 14" indicates a content of perfluorocarboxylic acids having 6 to 14 carbon atoms and their derivatives. In the following table, the content of PFOA and its salt in each of Examples 1 to 5 is a content of PFOA and its salt based on 100 mass parts of the low molecular weight PTFE after drying at 120° C.; and the content of C6 to 14 in each of Examples 1 to 5 is a content of C6 to 14 based on 100 mass parts of the low molecular weight PTFE after drying at 120° C. The content of PFOA and its salt in each of Comparative Example 1 and Example 6 is a content of PFOA and its salt based on 100 mass parts of the low molecular weight PTFE obtained in each of Comparative Example 1 and Example 6; and the content of C6 to 14 in each of Comparative Example 1 and Example 6 is a content of C6 to 14 based on 100 mass parts of the low molecular weight PTFE obtained in each of Comparative Example 1 and Example 6.

[Table 2]

| | Raw material PTFE manufactured by Daikin Industries Ltd. | Step (I) | | | Step (II) | | | | | |
|---|---|---|---|---|---|---|---|---|---|---|
| | | Irradition with ionizing radiation | | | Stream passing treatment | | Ethanol washing treatment | | 10% NaOH aqueous solution washing treatment | |
| | | Temperature | Atmosphere | Dose | Steam temperature | Passing time | Temperature of ethanol | Washing time | Temperature of NaOH aqueous solution | Washing time |
| Comp. Ex. 1 | F-104 | room temperature | air | 150 kGy | | | | | | |
| Ex. 1 | F-104 | room temperature | air | 150 kGy | 100° C. | 30 minutes | | | | |
| Ex. 2 | F-104 | room temperature | air | 150 kGy | | | 25° C. | 30 minutes | | |
| Ex. 3 | F-104 | room temperature | air | 150 kGy | | | | | 25° C. | 60 minutes |
| Ex. 4 | F-104 | room temperature | air | 150 kGy | | | | | | |
| Ex. 5 | F-104 | room temperature | air | 150 kGy | | | | | 95° C. | 10 minutes |
| Ex. 6 | F-104 | room temperature | air | 150 kGy | | | | | | |

| | Raw material PTFE manufactured by Daikin Industries Ltd. | Step (II) | | | | | | | Content of PFOA (ppb) | Content of C6 to 14 (ppb) | Melt viscosity (Pa·s) |
|---|---|---|---|---|---|---|---|---|---|---|---|
| | | Acetone washing treatment | | Decompression treatment | | Drying treatment | | | | | |
| | | Temperature of acetone | Washing time | Pressure | Decompression time | Drying temperature | Drying time | | | | |
| Comp. Ex. 1 | F-104 | | | | | | | | 92 | 255 | $5.5 \times 10^4$ |
| Ex. 1 | F-104 | | | | | 110° C. | 12 hours | | <5 | <5 | $5.6 \times 10^4$ |
| Ex. 2 | F-104 | | | | | 110° C. | 12 hours | | <5 | <5 | $5.6 \times 10^4$ |
| Ex. 3 | F-104 | | | | | 110° C. | 12 hours | | <5 | <5 | $5.6 \times 10^4$ |
| Ex. 4 | F-104 | 25° C. | 30 minutes | | | 110° C. | 12 hours | | <5 | <5 | $5.6 \times 10^4$ |
| Ex. 5 | F-104 | | | | | 110° C. | 12 hours | | <5 | <5 | $5.6 \times 10^4$ |
| Ex. 6 | F-104 | | | −0.09 MPa (gauge pressure) | 48 hours | | | | 18 | 24 | $5.6 \times 10^4$ |

INDUSTRIAL APPLICABILITY

The low molecular weight PTFE obtained in the production method of the present invention can be usefully used for producing plastics, inks, cosmetics, coating materials, greases, etc.

The present invention includes following embodiments:

Embodiment 1

A method for producing a composition containing low molecular weight polytetrafluoroethylene, comprising:
(I) irradiating a composition containing high molecular weight polytetrafluoroethylene with ionizing radiation to obtain a composition containing low molecular weight polytetrafluoroethylene having a melt viscosity at 380° C. in the range of $1.0 \times 10^2$ to $7.0 \times 10^5$ Pa·s; and
(II) carrying out at least one selected from the group consisting of washing treatment, steam treatment and decompression treatment on the composition containing low molecular weight polytetrafluoroethylene.

Embodiment 2

The method for producing a composition containing low molecular weight polytetrafluoroethylene according to Embodiment 1, wherein the step (II) comprises carrying out at least one selected from the group consisting of washing treatment, steam treatment and decompression treatment on the composition containing low molecular weight polytetrafluoroethylene obtained in the step (I) and carrying out grinding treatment.

Embodiment 3

The method for producing a composition containing low molecular weight polytetrafluoroethylene according to Embodiment 1 or 2, wherein the step (II) comprises carrying out grinding treatment on the composition containing low molecular weight polytetrafluoroethylene obtained in the step (I) and thereafter carrying out at least one selected from the group consisting of washing treatment, steam treatment and decompression treatment.

Embodiment 4

The method for producing a composition containing low molecular weight polytetrafluoroethylene according to any one of Embodiments 1 to 3, wherein washing using a solution containing at least one selected from the group consisting of water and an organic solvent is carried out as the washing treatment.

Embodiment 5

The method for producing a composition containing low molecular weight polytetrafluoroethylene according to any one of Embodiments 1 to 4, wherein the steam treatment uses water, an alkaline aqueous solution or a polar solvent as a treatment solution in the form of steam at a temperature in the range of 90° C. to 160° C.

Embodiment 6

The method for producing a composition containing low molecular weight polytetrafluoroethylene according to any one of Embodiments 1 to 5, wherein the composition containing high molecular weight polytetrafluoroethylene is powder.

Embodiment 7

The method for producing a composition containing low molecular weight polytetrafluoroethylene according to any one of Embodiments 1 to 6, wherein the composition containing low molecular weight polytetrafluoroethylene obtained in the step (I) further contains a low molecular weight fluorine-containing compound; and
the low molecular weight fluorine-containing compound is an acid having a fluorine-containing carbon chain having 6 to 14 carbon atoms or a derivative thereof.

Embodiment 8

The method for producing a composition containing low molecular weight polytetrafluoroethylene according to Embodiment 7, wherein a content of the low molecular weight fluorine-containing compound in the composition containing low molecular weight polytetrafluoroethylene obtained in the step (II) is 50 mass ppb or less based on the low molecular weight polytetrafluoroethylene.

Embodiment 9

The method for producing a composition containing low molecular weight polytetrafluoroethylene according to any one of Embodiments 1 to 8, wherein the low molecular weight fluorine-containing compound in the composition containing low molecular weight polytetrafluoroethylene obtained in the step (II) contains perfluorooctanoic acid and a salt thereof, and
a content of the perfluorooctanoic acid and a salt thereof is less than 25 mass ppb based on the low molecular weight polytetrafluoroethylene.

The invention claimed is:

1. A method for producing a composition containing low molecular weight polytetrafluoroethylene, comprising:
   (I) irradiating a composition containing high molecular weight polytetrafluoroethylene with ionizing radiation to obtain a composition containing low molecular weight polytetrafluoroethylene having a melt viscosity at 380° C. in the range of $1.0 \times 10^2$ to $7.0 \times 10^5$ Pa·s; and
   (II) after the irradiation, carrying out steam treatment on the composition containing low molecular weight polytetrafluoroethylene, and
   the steam treatment uses water, an alkaline aqueous solution or a polar solvent as a treatment solution in the form of steam at a temperature in the range of 90° C. to 160° C.

2. The method for producing a composition containing low molecular weight polytetrafluoroethylene according to claim 1, wherein the step (II) comprises carrying out grinding treatment on the composition containing low molecular weight polytetrafluoroethylene obtained in the step (I) and thereafter carrying out steam treatment.

3. The method for producing a composition containing low molecular weight polytetrafluoroethylene according to claim 1, wherein the composition containing high molecular weight polytetrafluoroethylene is powder.

4. The method for producing a composition containing low molecular weight polytetrafluoroethylene according to claim 1, wherein the composition containing low molecular weight polytetrafluoroethylene obtained in the step (I) further contains a low molecular weight fluorine-containing compound; and
the low molecular weight fluorine-containing compound is an acid having a fluorine-containing carbon chain having 6 to 14 carbon atoms or a derivative thereof.

5. The method for producing a composition containing low molecular weight polytetrafluoroethylene according to claim 4, wherein a content of the low molecular weight fluorine-containing compound in the composition containing low molecular weight polytetrafluoroethylene obtained in the step (II) is 50 mass ppb or less based on the low molecular weight polytetrafluoroethylene.

6. The method for producing a composition containing low molecular weight polytetrafluoroethylene according to claim 1, wherein the low molecular weight fluorine-containing compound in the composition containing low molecular weight polytetrafluoroethylene obtained in the step (II) contains perfluorooctanoic acid and a salt thereof; and
a content of the perfluorooctanoic acid and a salt thereof is less than 25 mass ppb based on the low molecular weight polytetrafluoroethylene.

* * * * *